US012737357B1

(12) United States Patent
Goel et al.

(10) Patent No.: US 12,737,357 B1
(45) Date of Patent: Sep. 15, 2026

(54) RESOURCE ALLOCATION BASED ON QUERY ANALYSIS

(71) Applicant: Amazon Technologies, Inc., Seattle, WA (US)

(72) Inventors: Dhruv Goel, Bellevue, WA (US); Sudipto Das, Redmond, WA (US); Jatin Singla, Redmond, WA (US); Kimi Shah, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 36 days.

(21) Appl. No.: 17/219,507

(22) Filed: Mar. 31, 2021

(51) Int. Cl.

| | |
|---|---|
| ***G06F 16/2453*** | (2019.01) |
| ***G06F 9/50*** | (2006.01) |
| ***G06F 16/2455*** | (2019.01) |
| ***G06F 16/248*** | (2019.01) |
| ***G06F 16/28*** | (2019.01) |

(52) U.S. Cl.
CPC ...... *G06F 16/24542* (2019.01); *G06F 9/5027* (2013.01); *G06F 9/5061* (2013.01); *G06F 16/24568* (2019.01); *G06F 16/248* (2019.01); *G06F 16/285* (2019.01)

(58) Field of Classification Search
CPC ......... G06F 16/24542; G06F 16/24568; G06F 16/285; G06F 16/248; G06F 9/5027; G06F 9/5061
USPC .......................................................... 707/737
See application file for complete search history.

(56) References Cited

U.S. PATENT DOCUMENTS 8,886,781 B2 * 11/2014 Jain ..................... G06F 16/1827 709/248
8,918,363 B2 * 12/2014 Naidu ..................... G06F 16/27 709/248
10,305,824 B2 * 5/2019 Foebel .................. H04L 49/901
10,769,148 B1 * 9/2020 Binkert ............. G06F 16/24542
2020/0050694 A1 * 2/2020 Avalani ................... G06F 16/25
2020/0133732 A1 * 4/2020 Kondiles ............... G06F 9/5027

* cited by examiner

*Primary Examiner* — Giovanna B Colan
(74) *Attorney, Agent, or Firm* — Davis Wright Tremaine LLP

(57) ABSTRACT

A distributed computing system comprises a plurality of clusters of computing devices, including at least a first cluster with a first number of computing devices and a second cluster with a second number of computing devices. In response to receiving a request to process a query, the distributed computing system analyzes the query to generate an estimate of computing resources to be used when processing the query. The distributed computing system selects between the first and second cluster, based at least in part on the estimate, and tentatively assigns the query to the selected cluster for processing. The cluster to which the request is assigned determines if it has sufficient capacity to process the request.

20 Claims, 8 Drawing Sheets distributed system 102 control plane 106 query analysis 108 query history 110 query identification 112 capacity allocation 114 query placement 116

4-node clusters 120

8-node clusters 122

32-node clusters 124 client 104 performance statistics 220 query statistics 224 cluster 202 leader node (admission service) 204 member node 206 member node 208 member node 210 query 226 query size estimate 228 query placement 216 cluster 212 capacity allocation 314 additional cluster 326

4-node clusters 320

8-node clusters 322

32-node clusters 324 surplus cluster 328 cluster & cluster group statistics 302 cluster & cluster group statistics 304

RESOURCE ALLOCATION BASED ON QUERY ANALYSIS

BACKGROUND

Distributed computing systems are increasingly used to provide flexible and scalable access to computing resources. In some cases, these resources are used to process queries of various types and complexities. The flexibility and scalability of a distributed computing system may be beneficial in many scenarios, since it may allow the user to avoid managing the computing resources used to run these queries. However, existing techniques for dynamically allocating computing resources in a distributed computing system can be improved.

BRIEF DESCRIPTION OF THE DRAWINGS

Various techniques will be described with reference to the drawings, in which.

DETAILED DESCRIPTION

In an example, a distributed computing system includes a number of clusters of computing systems. A cluster comprises a number of servers or other computing devices which may work collectively to process a request. The clusters, in this example, are grouped in pools organized by size, such as a group of clusters with four computing devices in each cluster, a group with eight computing devices in cluster, and so on. To process queries and other comparable types of requests, a portion of the distributed system analyzes the query to estimate amounts of computing capacity that may be utilized by processing the query, and a query placement service assigns the query to a cluster whose size is determined to be appropriate, based on the estimated capacity utilization and the query placement service's understanding of how busy each cluster of the appropriate size is.

In a further aspect of the example, the cluster assigned to process a query, based on the query analysis and capacity utilization estimate just described, determines whether the query can be processed given current conditions on the cluster. Due to being more recent, these may be somewhat different than the conditions considered by the query placement service. In some cases, the leader node of the cluster might determine that the query cannot be processed at the present time, because insufficient resources are available. If so, it can notify the query placement service that the request cannot be processed, and can also provide information describing the cluster's current state. On the other hand, the leader node might decide that the query can be processed by the cluster, and proceed to do so. In this case, the leader node can return information indicating how the query performed, so that the query placement service can make improved placement decisions for the same or similar queries in the future.

Figure 1:
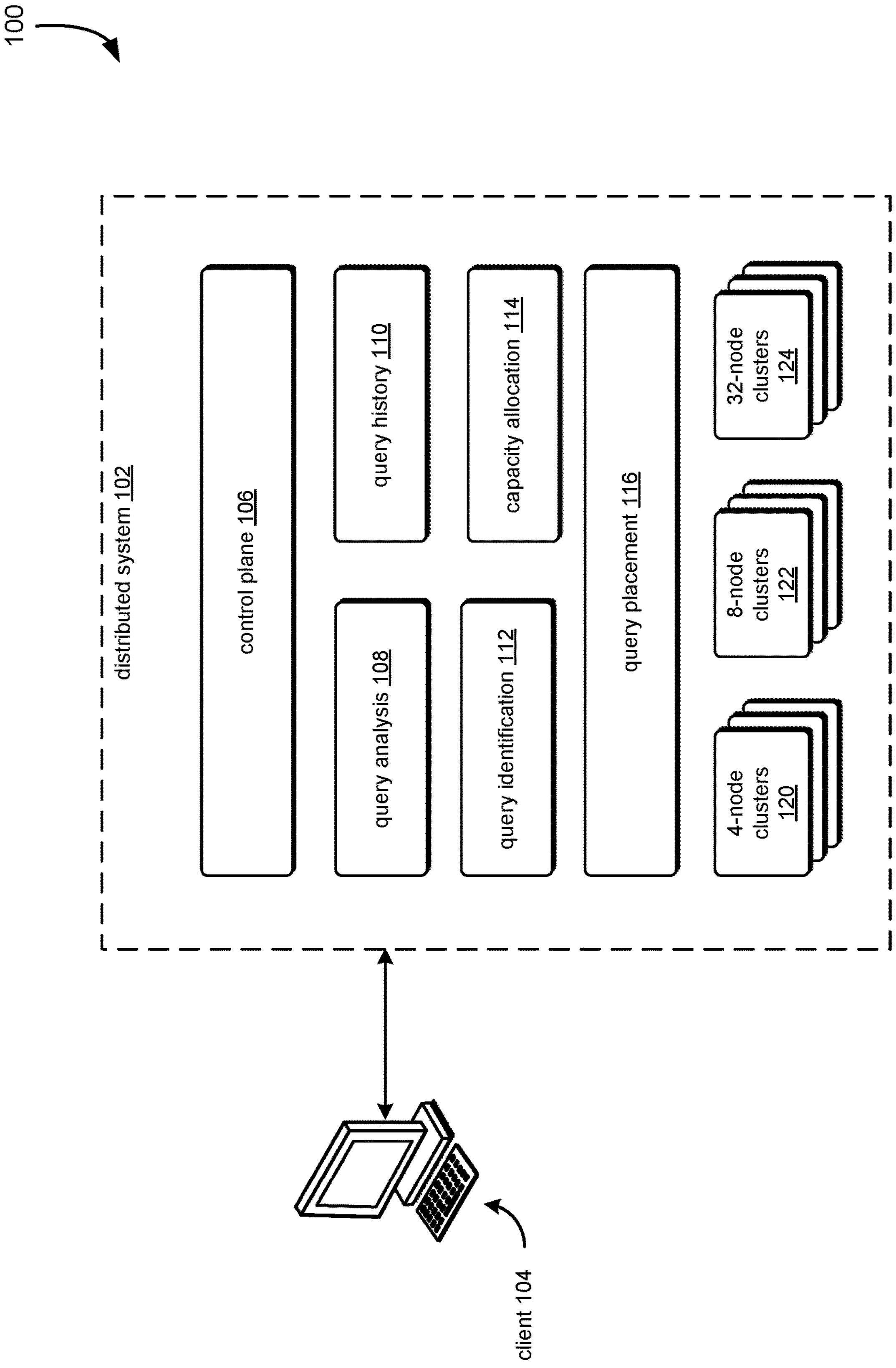
FIG. 1 illustrates an example of a distributed computing system, in accordance with at least one embodiment.

FIG. 1 illustrates an example of a distributed computing system, in accordance with at least one embodiment. In the depicted example 100, a distributed system 102 process queries received by a client 104. The queries can pertain to any of a wide variety of commands, including but not limited to database queries, scripts, lambda functions, and so forth.

The distributed system 102, in at least one embodiment, comprises various computing devices on which a variety of services, functions, software modules, and the like are hosted. Although FIG. 1 depicts particular examples of these services, functions, software modules, and the like, it will be appreciated that, in various embodiments, the depicted components may be combined, split, rearranged, or in some cases omitted, except where the presence of a feature or function is logically required in a particular embodiment. Accordingly, it will be appreciated that the depicted arrangement of services, functions, software modules, and the like is intended to be illustrative rather than limiting.

The distributed system 102, in at least one embodiment, comprises groups of clusters. For example, distributed system 102 might contain a group 120 of 4-node clusters, a group 122 of 8-node clusters, and a group 124 of 32-node clusters. Here, a node refers to a computing device that makes up part of a given cluster. For example, in at least one embodiment, a cluster of four nodes might consist of four computing devices, each configured to run all or part of a query. In the case of a distributed database system, for example, each of the four nodes might contain a replica of a table, or each of the four nodes might contain a partition of one-fourth of a table. Other data storage arrangements are possible. For example, in at least one embodiment, some or all of the storage utilized to process a query is externalized to a remote storage system.

A query, in at least one embodiment, is a request to obtain data. For example, in at least one embodiment, a query comprises a declarative statement, such as a structured query language ("SQL") statement, that identifies a set of data that should be returned. These statements may involve considerable complexity, which can, in various embodiments, make predicting resource utilization challenging. In other embodiments, other means or languages are used to indicate the query. For example, a query could be indicated via simple commands, specified via a script or other programming language, and so forth.

In at least one embodiment, the distributed system 102 implements a serverless computing environment. Here, serverless computing refers to the ability of client 104 to access computing capacity on-demand, without necessarily having to manage, or even know of, any specific computing instances. In the example 100, serverless computing may be provided by the distributed system 102 on behalf of the client 104. The distributed computing system may, for example, dynamically allocate or deallocate computing resources needed to serve the demand imposed by the client's 104 queries.

The client 104, in at least one embodiment, comprises one or more computing devices. The client 104 may, for example, include one or more computing devices on which various applications are run. The client 104 may issue queries to distributed computing system 102, and receive responses to those queries once the queries are processed. For example, in at least one embodiment, the client 104 issues a database query to the distributed system 102 and receives a response comprising the data requested by the query. Note that although FIG. 1 depicts a single client 104, the distributed system 102, in various embodiments, may provide service to a number of such clients.

The queries issued by client 104 may vary in terms of the computing resources required to process them. Some queries may be quickly executed, and require few computing resources. Other queries, however, may take considerable time and resources. For example, in a database or data warehousing context, a query to retrieve a specific record may be executed in a fraction of a second on a single computing device, while a data mining or data analysis query may take hours and utilize significant amounts of computing resources, across many computing devices.

In at least one embodiment, distributed system 102 comprises components that analyze a query and cause the query to be assigned to a cluster that is appropriately sized and estimated to have sufficient available capacity to execute the query. Note that the distributed nature of the system 102 may make having real-time information about the cluster's capacity impractical. In at least one embodiment, a two-phase approach is used, in which the query is analyzed and its predicted capacity utilization is compared to the most recent available statistics regarding the clusters' capacity utilization. The query is then assigned to the most appropriate cluster, in view of this information. A leader node in the cluster may then further analyze the query's expected capacity utilization, and determine, in view of more recent information, whether the query can be executed by that cluster. If not, the cluster can decline the assignment, and another cluster can be picked. In at least one embodiment, if the clusters begin to frequently report that their capacity utilization is above some threshold amount, the distributed system 102 may determine to dynamically add new clusters. The new clusters can be sized as appropriate in view of the amount and type of capacity being utilized by the queries. In at least one embodiment, embodiments may make informed capacity allocation decisions based on information obtained by analyzing the incoming queries.

In at least one embodiment, distributed system 102 comprises a control plane 106. The control plane 106 may perform a variety of tasks related to management of the distributed system 102. These tasks may include, but are not limited to, facilitating installation of new computing devices and clusters, managing network communications, receiving administrative and other requests from the client 102, and so forth.

In at least one embodiment, distributed system 102 comprises a query analysis component 108. In at least one embodiment, query analysis comprises one or more stages of preparing a received query for execution, such as parsing, constructing an abstract syntax tree, generating a logical query execution plan, generating a physical execution plan, and so forth. The query analysis component 108 may be an independent module, or it may be a component that is embedded into query processing software. For example, in at least one embodiment, the computing devices, or nodes, that make up each cluster might have database software installed that is capable of performing the query analysis. One of these devices, such as the leader node associated with the most recent execution of the same query, or of a similar query, might be tasked with generating a query plan and providing relevant information from the plan to the query placement service 116. In at least one embodiment, this information comprises the logical plan, which describes the logical operations that need to be performed to complete processing of the query, but which may lack description of any underlying physical operations.

In at least one embodiment, distributed system 102 comprises a query history component 110. The query history component 110 may also comprise software that is executed on a computing device, such as the same computing device on which a query placement service 116 might operate. The query history component 110 may, in various embodiments, be combined with the query placement service 116. The query history component 110 may obtain and record various statistics associated with a given query. These statistics can include, but are not limited to, the time taken to execute the query or measures of the amount of one or more computing resources used to execute the query, such as memory, compute, storage, or network capacity.

In at least one embodiment, distributed system 102 comprises a query identification component 112. The query identification component may also comprise software that is executed on a computing device, such as the same computing device on which a query placement service 116 might operate. The query identification component 112 may, in various embodiments, be combined with the query placement service 116 and/or with the query history component 110. The query identification component 112 provides functionality related to identifying the same or similar queries, so that statistics collected by the query history component 110 can be stored or subsequently retrieved. In at least one embodiment, the identification component 112 computes a hash of a query, and that hash is used to identify a query, to store statistics related to the query, and to subsequently retrieve the statistics when another query is receives and hashes to the same identifier.

The example distributed system 102 comprises a query placement service 116 that leverages information provided by the query analysis 108, query history 110, and query identification 112 components. The query placement service 116 utilizes this information to assign queries to a cluster estimated to be both suitable for processing the query and that is believed, in light of the most recent information available, to have sufficient available capacity.

In at least one embodiment, a capacity allocation component 114 that monitors information related to capacity utilized by the clusters 120-124. The capacity allocation component 114, in at least one embodiment, comprises software that is executed on executed on a computing device, such as the same computing device on which a query placement service 116 might operate. The capacity allocation component may, in various embodiments, be combined with the query placement service 116. The capacity allocation component 114 may receive cluster performance statistics from the groups of clusters 120-124 and determine whether any of the groups of clusters 120-124 are consistency over-utilized or under-utilized. If so, the capacity allocation component 114 may cause a cluster to be added to or removed from the appropriate group of clusters.

Figure 2:
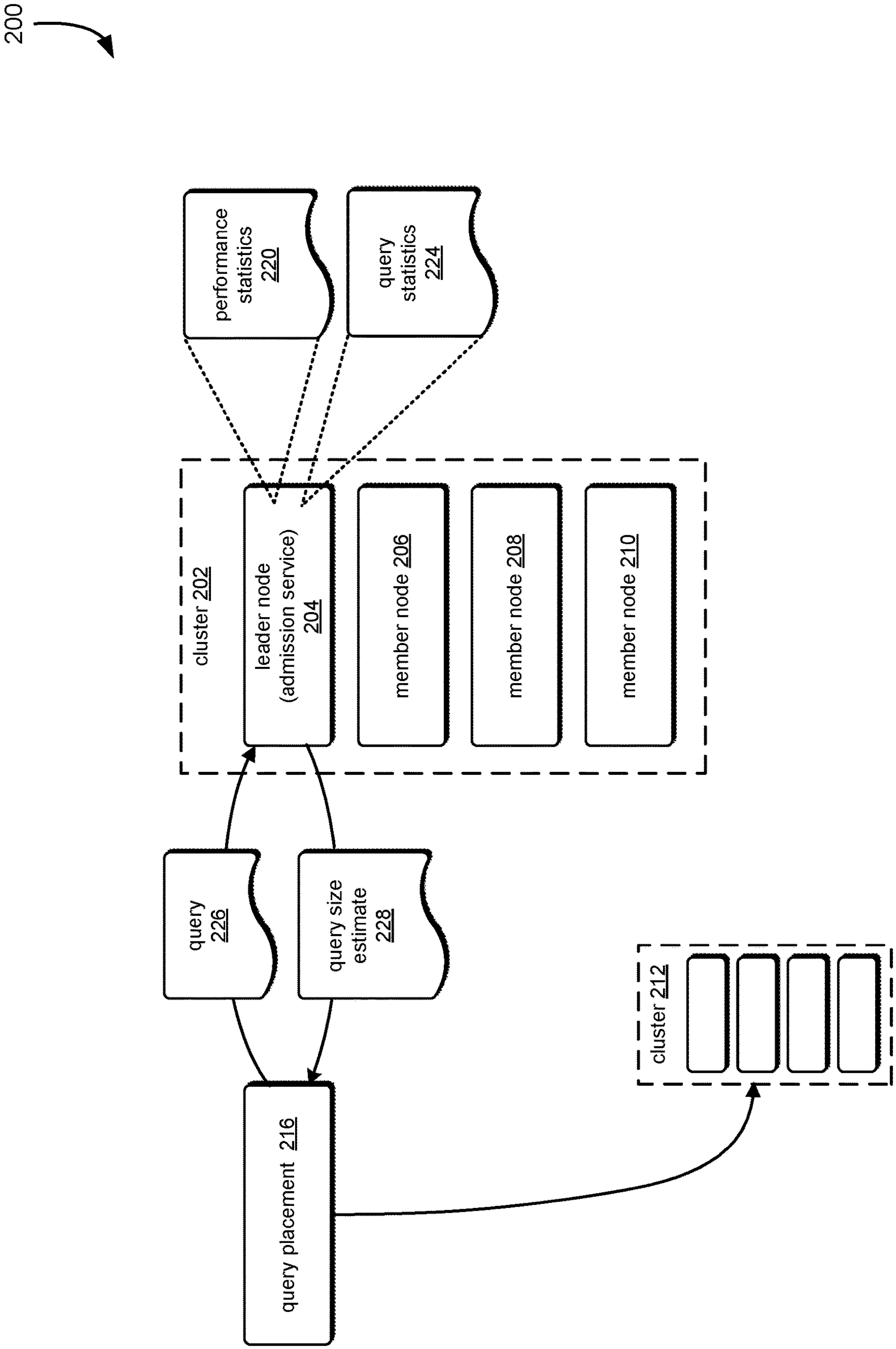
FIG. 2 which illustrates an example of interaction between a query placement service and a cluster, in accordance with at least one embodiment.

The operation of the example distributed system 102 may be further understood in view of FIG. 2, which illustrates an example 200 of interaction between a query placement service 216 and a cluster 202. In at least one embodiment, a query placement service 216 tentatively assigns a query 226 to cluster 202. The query placement service 216 may, for example, send a message to cluster 202 indicating that it has been tentatively assigned the query 226, and include in the message data describing the query 226. In at least one embodiment, this data describes or defines the query, and could include a SQL query, source code, compiled code, and so forth.

The query placement service 216 may tentatively assign the query 226 to the cluster 202 based on a number of factors, potentially including past performance of the same query or a similar query, and the most recent performance data it has received from the cluster 202. In at least one embodiment, the query 226 has not yet been analyzed at this stage, and the query placement service 216 intends to leverage the computing resources of cluster 202 to perform the initial analysis of the query.

In at least one embodiment, the query is sent to the current leader node of the cluster 202. The cluster 202 may comprise several nodes 204-210, each of which is a computing device capable of performing some or all of the cluster's function. For example, in at least one embodiment, each cluster 202 may comprise software for processing queries and data to which the query is applied. One of these nodes may be designated as a leader node 204. The leader node 204, in at least one embodiment, performs initial processing of the query and subsequent distribution of work related to processing the query. In at least one embodiment, some of these functions may be performed by an admission service, which may also be hosted on the leader node. These functions can also include determining whether the query can or should be processed by the cluster, for example by determining whether current capacity utilization would prevent efficient processing of the query.

In at least one embodiment, the leader node 204 analyzes the query 226. This can include steps such as parsing, syntax tree constructions, formulation of a logical plan for executing the query, and formulation of a physical plan. An estimate of the computing capacity can be based on the logical or physical plan. In at least one embodiment, the logical plan is used to generate a widely applicable estimate of query size. It may be the case, for example, that the physical plan contains details particular to the configuration or state of the cluster 202, but not necessarily applicable to other clusters. For example, the physical plan may be applicable to comparable 4-node clusters, but not applicable to 8-node or 16-node clusters. The logical plan, on the other hand, may in some embodiments contain higher-level operations that can be used to estimate the cost or efficiency of processing a query on a variety of cluster configurations.

In at least one embodiment, leader node 204 analyzes the query as just described, and returns a query size estimate 228 to the query placement service 216. Equivalently, in some embodiments, the leader node 204 sends the logical plan or other data from which a query size estimate 228 can be formulated.

The query placement service 216, in at least one embodiment, uses the query size estimate 228 and its most recent knowledge of cluster performance to determine whether cluster 202 is the most appropriate choice, under the current circumstances, to process the query 226. For example, the query placement service, after analyzing the query size estimate 228, might determine that a 16-node cluster (not depicted in FIG. 2), rather than the depicted 4-node cluster 202, is better suited to process the query. The query placement service 216 might then withdraw the tentative assignment from cluster 202 and instead tentatively assign the query to the 16-node cluster. The 16-node cluster might then process the query, or determine that it is unable to process the query due to its current workload.

In at least one embodiment, some of the aforementioned functions of the query placement service 216 are performed by the leader node 204, in order to reduce round-trips between the query placement service 216 and the leader node 204. The leader node 204 may, for example, generate the query size estimate 228 and determine, based on the estimate and its current workload, that it is capable of processing the query. Note that the leader node 204 may possess or be able to obtain more recent performance statistics for its own cluster than a remote query placement service 216. If the leader node 204 determines that it is capable of processing the query, it can proceed to do so without an intermediate step of returning the query size estimate 228 and relying on permission from the query placement service 216 to proceed. Instead, it can return the query size estimate 228 asynchronously, or after processing the query. In at least one embodiment, the query placement service 216 can use this information subsequently to make a placement decision for the same or similar queries, without needing to fully analyze the query beforehand. This can be done, for example, using the query identification and query history components depicted in FIG. 1.

Analysis of the query, as just described, may cause the query placement service 216 to tend to assign certain queries to certain sized clusters. For example, smaller queries might tend to be assigned to 4-node clusters, while larger queries might tend to be assigned to 8-node or 16-node clusters. Depending upon the distribution of theses queries, certain types of cluster groups might tend to be over-utilized or under-utilized.

As noted above, assignment of query 226 to cluster 202 may initially be made on a tentative basis, until an admission service, such as the depicted admission service 204 on leader node 204, determines whether or not the cluster 202 is capable of processing the query. For example, in at least one embodiment, the admission service 204 obtains recent performance information from the various nodes 204-210 in the cluster, and determines whether, in view of that information, the cluster 226 is capable of processing the query 226 within some threshold amount of time. A cluster, such as leader node 204, may maintain performance statistics 220 and query statistics 224. The performance statistics 220 may describe node workload, or cluster workload, and the query statistics 224 may describe performance metrics pertaining to the execution of particular queries. If the admission service determines that the query cannot or should not be processed on the node 204, it can so indicate to the query placement service 216. The query placement service 216 may then determine to place the query on a different cluster 212. When the same or a similar query is subsequently received, the placement service 216 may determine that cluster 212 was used to process the earlier query, and determine to tentatively assign the new query to the same cluster 212.

Figure 3:
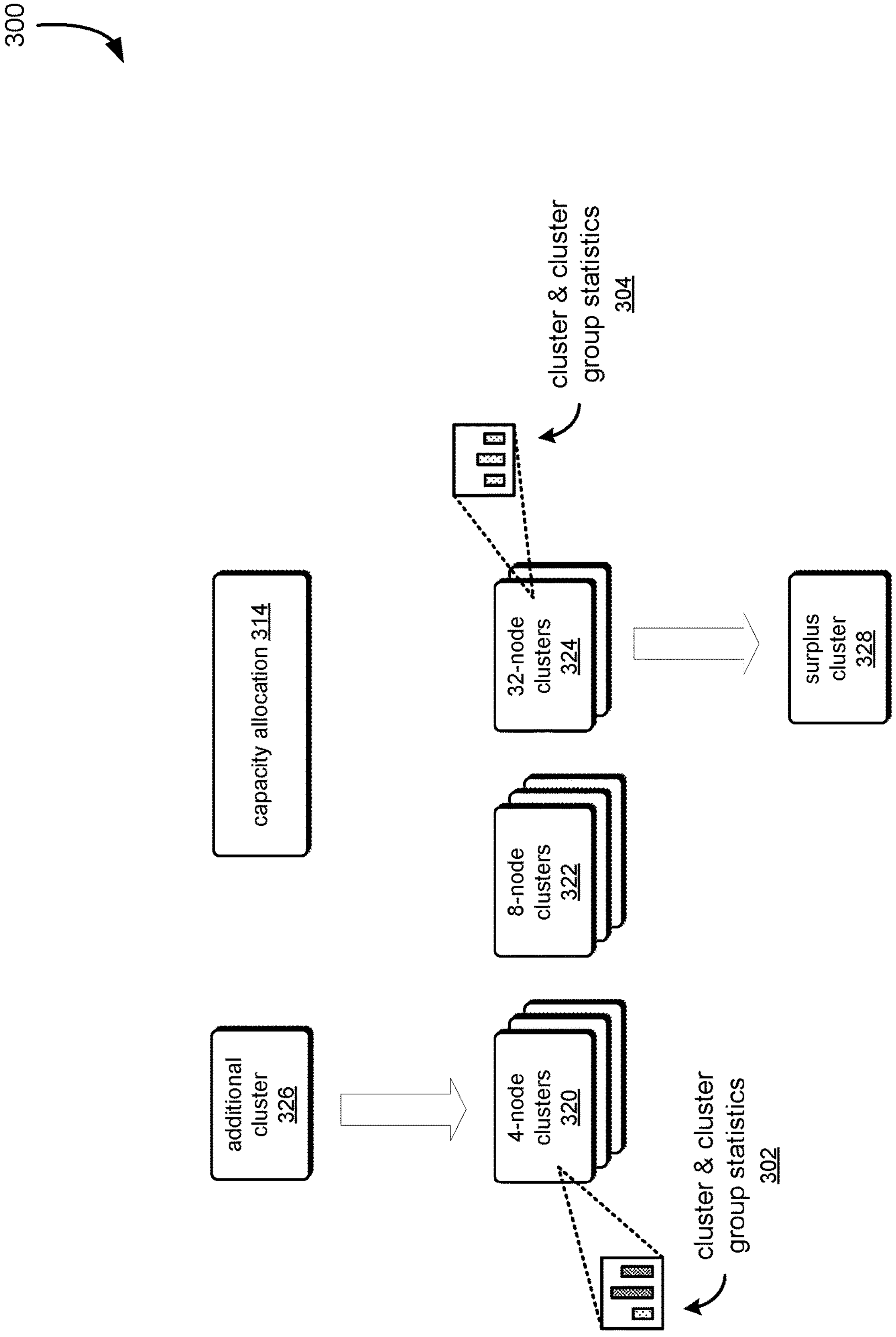
FIG. 3 illustrates an example of dynamically configuring cluster groups, in accordance with at least one embodiment.

FIG. 3 illustrates an example of dynamically configuring cluster groups, in accordance with at least one embodiment. In the example 300, cluster groups 320-324 correspond to cluster groups 120-124 depicted in FIG. 1. The distributed system 102, as depicted in FIG. 1, analyzes an incoming query, obtains an estimate of the query size, and assigns the query to an appropriately sized cluster, based on the estimated query size. As noted, however, the assigned cluster may decline the assignment. If this happens too frequently, a capacity allocation component 314, similar to the one depicted in FIG. 1, may add clusters to a cluster group in order to provide a requisite amount of capacity.

The capacity allocation component 314 may also periodically obtain statistics 302, 304 pertaining to the clusters and groups of clusters. In at least one embodiment, these statistics contain the frequency with which a cluster declines processing of a query, the frequency with which no cluster in a group is able to process a query, and the degree to which the computing capacity of the clusters and cluster groups is being utilized. In at least one embodiment, the capacity allocation component 314 determines to add an additional cluster 326 to a cluster group 320, or to remove a surplus cluster 328 from another cluster group 324. These determinations may be based on the distribution of utilization among the groups of clusters. For example, if 4-node clusters appear, based on the statistics 302, to be over-utilized, the capacity allocation component 314 might determine to add an additional 4-node cluster 320 to a 4-node cluster group. Similarly, if statistics 304 indicate that a 32-node cluster group 324 is being under-utilized, the capacity allocation component 314 might determine to remove a 32-node cluster 324 from the 32-node cluster group 324. Note that in some cases and embodiments, the nodes in a removed cluster might be reconfigured and used as nodes in a different-sized cluster.

Figure 4:
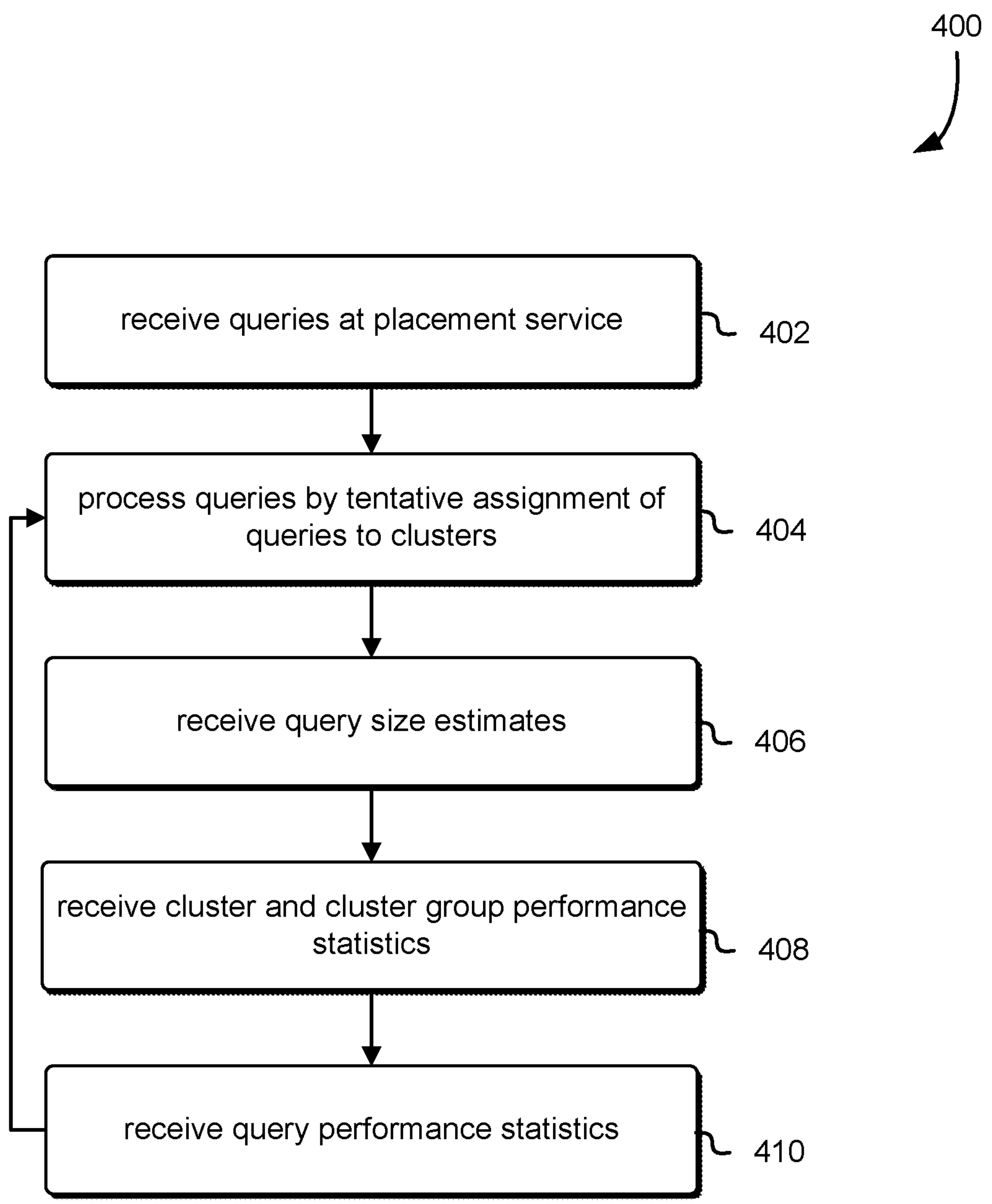
FIG. 4 is a flow diagram depicting an example process to tentatively assign a query to a cluster, in accordance with at least one embodiment.

Tentative assignment of queries to clusters may be further understood in view of FIG. 4, which illustrates an example process 400 to tentatively assign a query to a cluster, in accordance with at least one embodiment. Although FIG. 4 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), at least some of the depicted steps may be reordered or performed in parallel. In at least one embodiment, the steps depicted in relation to FIG. 4 are performed by a distributed system, such as an embodiment of the distributed system 102 depicted in FIG. 1.

At 402, a distributed system receives queries for processing. These may be received, for example, by a placement service component of a distributed system, such as the placement service depicted in FIG. 1.

At 404, the distributed system processes queries by tentatively assigning queries to clusters. In at least one embodiment, this tentative assignment is done by selecting a potential candidate cluster based on available information which may potentially include, but is not limited to, query size estimates, cluster and cluster group performance statistics, and query performance statistics.

In some cases, a tentative assignment is accepted. In at least one embodiment, a tentative query assignment is processed by a leader node of a cluster, which analyzes the query to the point where an estimate of the query's size is available, and uses current local information to determine whether the cluster is capable of processing the request. If so, the leader can distribute work among the nodes of the cluster and cause the cluster to complete processing of the query. The leader node of the cluster can then return results of the query to other components of the distributed system, for routing back to the client. Alternatively, the leader node can send the results more directly to the client. In addition, as suggested by the depictions of operations 406-410, the leader node can provide a variety of information to the placement service for its use in subsequent placement decisions.

In other cases, a tentative assignment is rejected. This may occur, for example, if the leader node analyzes the query and determines, based on current local information, that the cluster does not have appropriate capacity to process the request. Note that in some cases, the rejection may be based on the lack of a specific resource that is indicated by the analysis of the query. For example, some query plans may require full scans of a table, and therefore are likely to be storage-intensive. Other plans might have intensive compute requirements, network requirements, or memory requirements. The system might predict, for example, that a plan with a sort operation would be relatively compute intensive, and determine that even though adequate amounts of other capacity types (such as memory, storage, and network) are available, it is nevertheless inadvisable to run the query on the cluster due to its node's lacking sufficient available compute capacity.

At 406, the placement service receives query size estimates. For a given query, a query size estimate can include one or more values that indicate, in any of various ways, amounts of one or more computing resources that are likely to be used by executing the query. For example, in at least one embodiment, the query is assigned a score, grade, or classification of the query's cost in terms of computing resource utilization. In other cases, one or more scalar values are generated to indicate estimated amounts of computing resources, such as the amounts of memory, compute, storage, and/or network capacity that might be utilized when the query is executed. As explained herein, these values estimates of query size are generated, in at least one embodiment, from query analysis. In some cases, the estimate is generated from information obtained in the logical plan phase of query analysis.

At 408, the placement service receives cluster performance and cluster group performance statistics. The cluster performance can relate to the specific performance of that cluster, and the nodes within it. For example, in at least one embodiment, the cluster performance statistics can indicate recent average levels of computing resource utilization for nodes in that cluster. The cluster group performance statistics can include statistics related to clusters of a particular size or type, such as statistics pertaining to all 4-node clusters in the system. For example, in at least one embodiment, the placement service receives information that it compiles into an average rate at which clusters of a particular size reject queries. This information can be used by a capacity allocation service to initiate adding or subtracting a cluster of a corresponding type.

At 410, the placement service receives query performance statistics. These statistics relate to performance of the query as observed. For example, in at least one embodiment, a cluster accepts a tentative query assignment, processes the query, and returns information indicating the computing resources used to process the query on that cluster, e.g. as measured during or after the query's execution.

Figure 5:
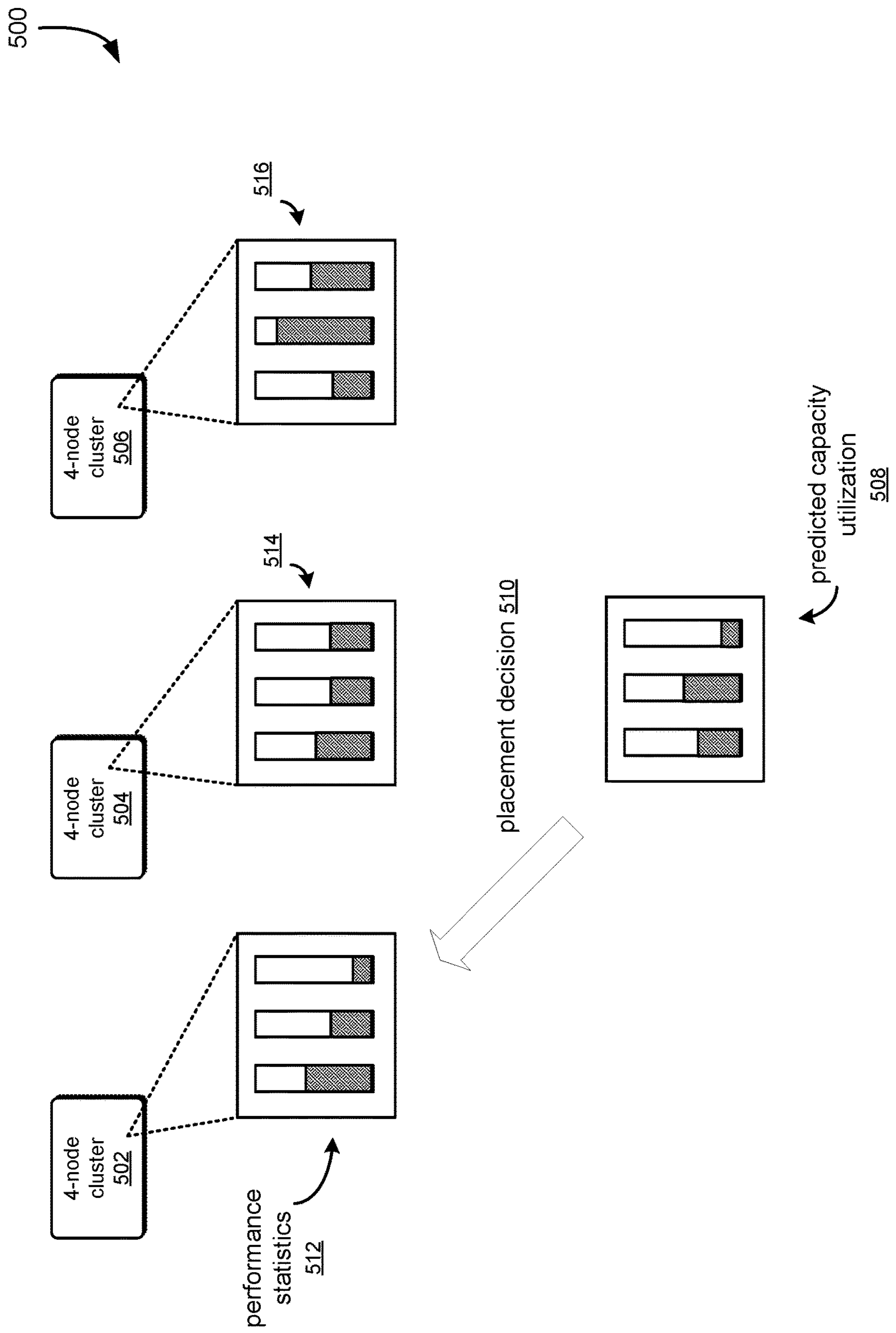
FIG. 5 illustrates an example of selecting a cluster for query assignment, in accordance with at least one embodiment.

FIG. 5 illustrates an example of selecting a cluster for query assignment, in accordance with at least one embodiment. In the depicted example 500, a query has been analyzed and its predicted capacity utilization 508 has been determined. This predicted capacity utilization may sometimes be referred to as the size or cost of the query. In at least one embodiment, predicted capacity utilization is expressed as a scalar numerical value, where higher numbers correspond to greater expected utilization. In other cases, predicated capacity utilization may be expressed as a plurality of numbers, each representing a different aspect of capacity utilization, such as compute, memory, network, and storage.

In the example 500, a set of 4-node clusters 502-506 are depicted as candidates for assignment of a query. Note that although the example 500 is described in relation to these 4-node clusters 502-506, techniques similar to those discussed in relation to FIG. 5 may be employed to evaluate whether a larger or smaller size of cluster is appropriate.

In at least one embodiment, a query placement service, such as the query placement service depicted in FIG. 1, may periodically obtain performance statistics 512-514 from the various clusters. These performance statistics 512-514 may, for example, be obtained when a query is assigned to a cluster, or on a periodic basis. In general, these statistics 512-514 may be somewhat out-of-date compared to the current state of the clusters, but they may nevertheless be accurate enough to make reasonably effective placement decisions 510.

In at least one embodiment, the placement service compares the predicted capacity utilization 508 of the query to the performance statistics for each cluster to determine which of clusters 502-506 are candidates for being assigned the query. In the example 500, these may be the two clusters 502, 504 for which there is sufficient available capacity for each type of classified resource. For example, the predicted capacity utilization 508 might have a high memory requirement, which could then exclude cluster 506 as a candidate because it is believed to have low memory capacity.

The placement service might then determine which of the candidate clusters 502, 504 to tentatively assign the query to. In at least one embodiment, this is done at random from among the nodes considered candidates after comparing the predicted capacity utilization 508 of the query to the performance statistics 512-516 of the clusters.

In some cases, the predicted capacity utilization 508 could be such that certain classes of clusters (such as the depicted 4-node clusters) do not have sufficient capacity to run the query. In such cases, a different class of cluster (such as an 8-node or 16-node cluster) might be considered instead.

In at least one embodiment, the system makes a determination, based on the predicted capacity utilization 508, regarding which class of node is most likely to be suitable for processing the query. For example, the predicted capacity utilization 508 might be mapped to the categories small, medium, and large, and then a size of cluster determined based on that classification. Once the class is determined, the embodiment might select a cluster from among the cluster group of that class.

Figure 6:
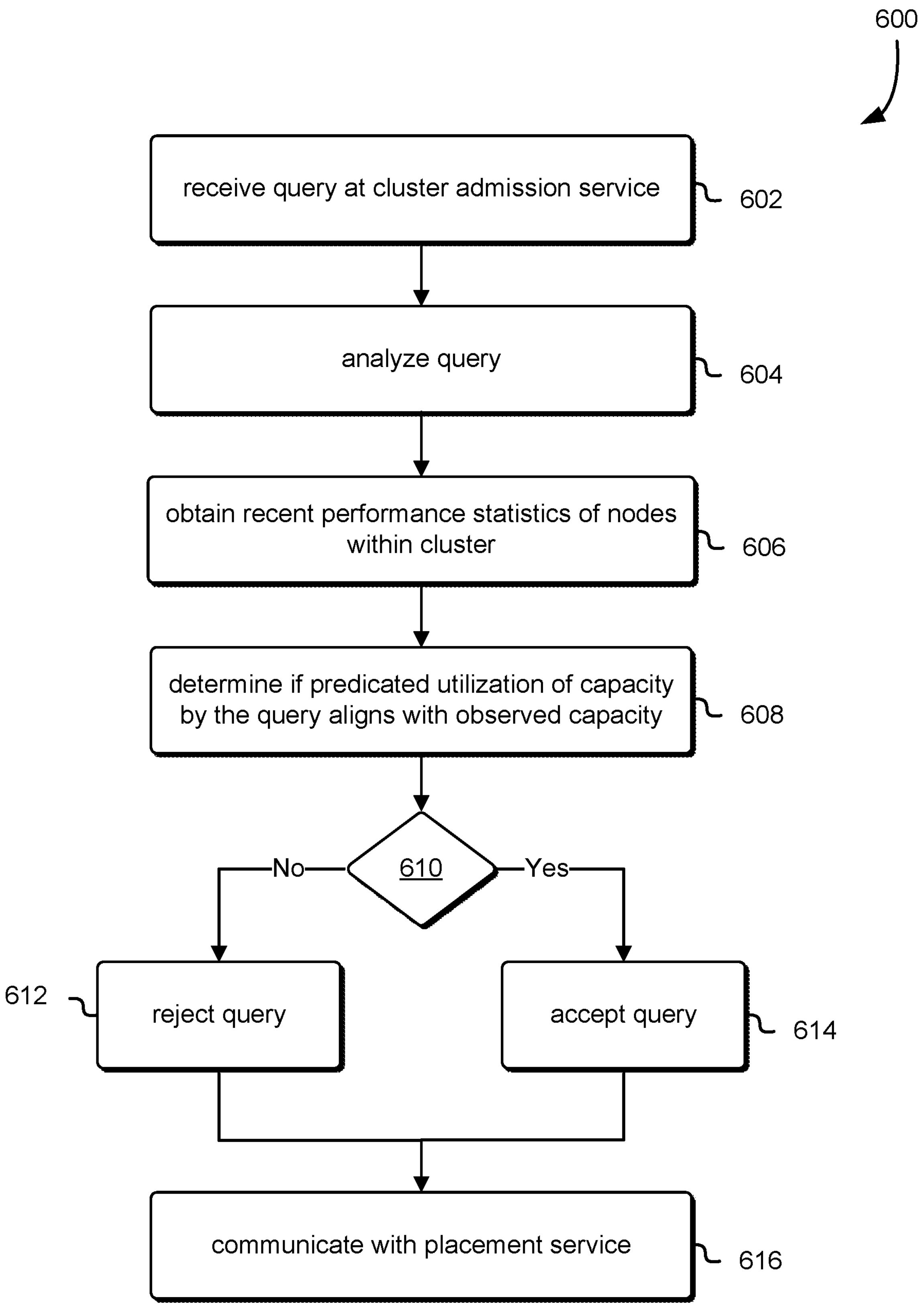
FIG. 6 is a flow diagram depicting an example process of determining whether to admit an assigned query, in accordance with at least one embodiment.

FIG. 6 illustrates an example process 600 of determining whether to admit an assigned query, in accordance with at least one embodiment. Although FIG. 6 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), at least some of the depicted steps may be reordered or performed in parallel. In at least one embodiment, the steps depicted in relation to FIG. 6 are performed by components of a distributed system, such as an embodiment of the distributed system 102 depicted in FIG. 1. In at least one embodiment, at least some of the steps are performed by components of associated with a particular cluster or group of clusters.

At 602, a query is received by a cluster admission service. In at least one embodiment, a cluster admission service is associated with a cluster or group of clusters. For example, a cluster admission service may be a software component that runs on a cluster's leader node, and makes admittance decisions, as described in relation to this figure, for that cluster. In another example, a cluster admission service runs on a computing device associated with a group of clusters, and makes admittance decisions for all of the clusters in that group.

At 604, the query is analyzed. In at least one embodiment, this involves one or more of the steps of parsing the query, forming an abstract syntax tree to represent the query, formulating a logical plan, and formulating a physical plan. As described herein, these operations may be performed by a leader node of a query, and relevant data resulting from these operations may be provided to the admission service.

At 606, the admissions service obtains recent performance statistics for nodes within a cluster. In at least one embodiment, the admissions service is more proximate to the nodes of the cluster than other components of the distributed system, and is therefore able to obtain these metrics with greater frequency and less latency than other components, such as the placement service. In some cases, the admission service may be able to obtain performance statistics for the nodes in a cluster in close to real-time.

In at least one embodiment, the statistics relate to utilization of computing resources on the nodes in the cluster. These statistics, sometimes referred to as metrics, can include measures of compute utilization, memory utilization, network utilization, and storage utilization. Here, compute utilization refers to utilization of a computing devices processors, such as its CPUs. Memory utilization refer to usage of higher-speed memories, such as RAM, network utilization refers to use of the network's capacity for communication, and storage utilization refers to usage of a device's capacity to store and retrieve data from long-term storage devices.

At 608, the admission service determines if the predicated utilization of capacity by the query aligns with the observed capacity. For example, the admission service may determine, based on the earlier analysis of the query that the size of the query, in terms of its capacity expected consumption of capacity, is large, but that the cluster also has a sufficiently large amount of available capacity. Likewise, the admission service might determine that the size of the query is large, but insufficient capacity is available to effectively process the query.

In at least one embodiment, the admission service evaluates predicted size and available capacity based on one or more parameters that define a service level agreement ("SLA"). For example, the system may aim to provide responses to queries of a certain size in less than some maximum amount of time. When making an admissions decision, the admission service can determine, based on available capacity and the predicted size of the query, whether or not this agreement is likely to be met.

At 610, an admissions decision is made based on the operations of step 608. If the capacity utilization predicted for the query does not align with the observed available capacity, the admissions service may, at 612, determine to reject the assignment of the query. This signals to the placement service that it should, if possible, find another cluster to process the query. On the other hand, if the predicted capacity utilization does align with the observed capacity, then the admissions service may determine to accept the assignment 614, and proceed to process the query on one or more selected nodes of the cluster.

At 616, the system communicates with the placement service to indicate that it has accepted or rejected the query, and to provide updated statistics and other information that is usable by the placement service for making subsequent assignment decisions.

Figure 7:
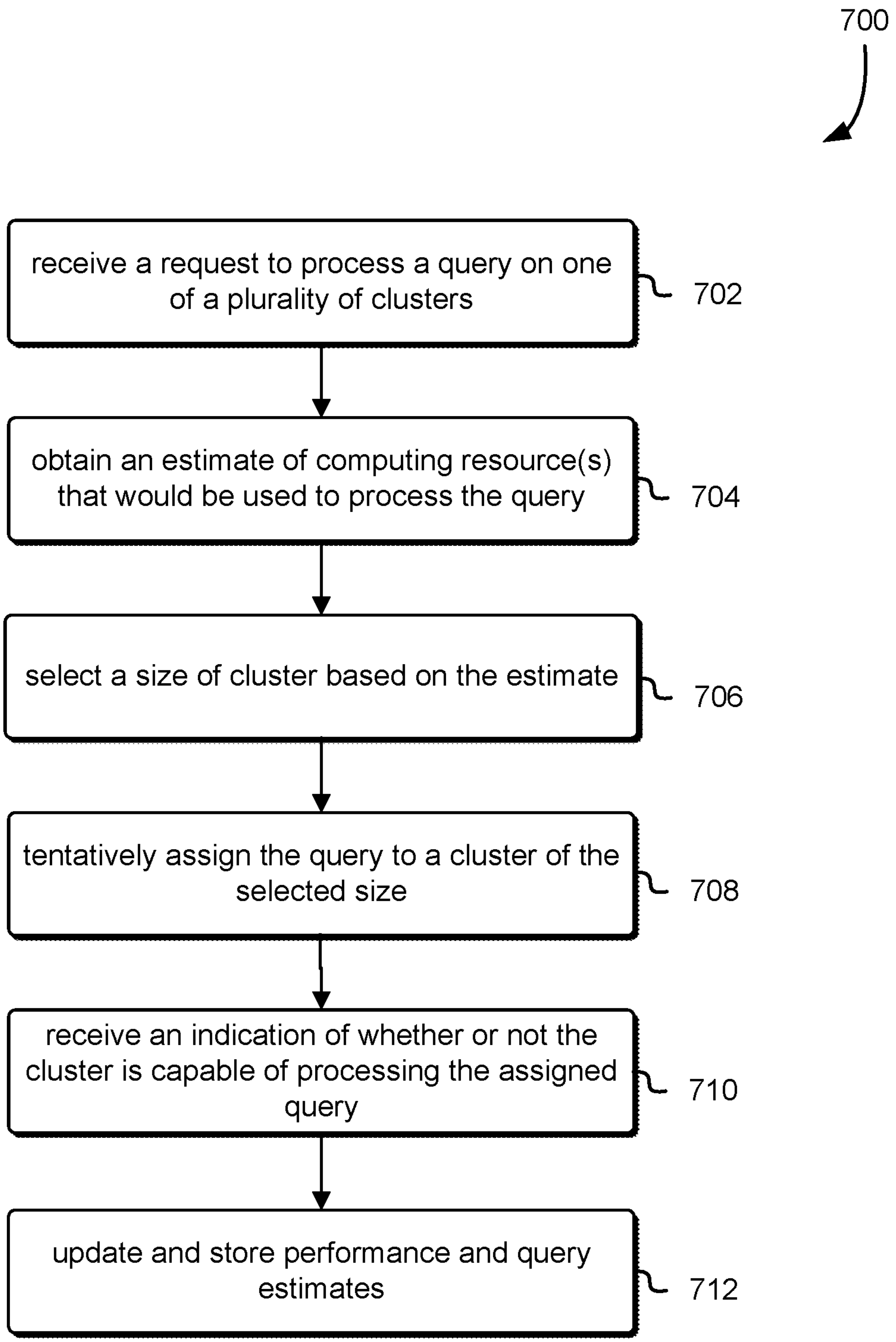
FIG. 7 is a flow diagram depicting an example of processing queries in a distributed system, in accordance with at least one embodiment.

FIG. 7 is a flow diagram depicting an example 700 of processing queries in a distributed system, in accordance with at least one embodiment. Although FIG. 7 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), at least some of the depicted steps may be reordered or performed in parallel. In at least one embodiment, the steps depicted in relation to FIG. 7 are performed by components of a distributed system, such as an embodiment of the distributed system 102 depicted in FIG. 1.

At 702, the distributed system receives a request to process a query. The request is to be processed on one of a plurality of clusters, selected by the system based at least in part on analysis of the query.

At 704, the distributed system obtains an estimate of the computing resources that would be used to process the query. In at least one embodiment, the query is analyzed, where analysis of the query comprises generating a logical plan of executing the query, and mapping from elements of the logical plan to estimates of the resources needed to process the query. The elements can include, for example, logical operations such as sorting, merging, joining, and performing aggregations. It will be appreciated that these examples are intended to be illustrative, and as such should not be construed in a manner which would limit the scope of potential embodiments to only those that include the specific examples provided.

In at least one embodiment, analysis of the query is performed by a current leader node of a cluster, and is subsequently returned to a placement service for future use. For example, even if this particular cluster processes the query, the estimate can be used with future instances of the same query, or similar query.

At 706, the distributed system selects a size or type of the cluster based, at least partially, on the estimate. Here, the size of a cluster refers to the number of computing devices that are included in the cluster. These devices may generally be available to process some or all of the query, and certain general assumptions may be made regarding the capacity of a cluster to process requests, based on its size. Larger clusters may, in general, be expected to be able to handle more complex queries. The distributed system uses the resource utilization estimate to map to a cluster size, and then may proceed to select a cluster with that size. In some cases, the type of cluster may also be considered. Here, type can refer to the availability of additional memory, storage, or compute capacity, or to other factors such as partitioning scheme.

At 708, the distributed system tentatively assigns the query to a cluster of the determined size. This process may involve multiple sub-steps, such as identifying one or more candidate clusters of the determined size (or type), examining the most recently available performance statistics for those clusters, and then selecting a cluster from among those that appear, based on the most recently available performance statistics, to have available capacity to process the query. The distributed system may then send, to the selected cluster, a message indicating that it has been tentatively assigned the task of processing the query.

At 710, the system receives an indication of whether or not the cluster is capable of processing the assigned query. The initial assignment, in at least one embodiment, is made under circumstances in which the placement service is either unaware of how busy a particular node is at any given time, or has outdated information. An admission service, operating one or in association with the cluster, examines the assigned query and determines whether or not it is capable of processing the request, given the admissions service's current assessment of how busy the cluster is, and in view of the resources that are predicted to be used by the query.

At 712, the distributed system updates and stores performance information and query estimates received during the aforementioned steps, for use in assigning subsequent requests. The information storage can include a generated query plan, an estimate of the resources expected to be used by performing the query, a measure of the resources actually used to process the query, statistics regarding how busy the cluster current is, and so forth.

In at least one embodiment, the distributed system keeps track of how busy different sizes or types of clusters are. For example, the distributed system may track how many times the 4-node clusters in the system respond that they are too busy to process an assigned query, or track trends in resource utilization on these nodes. In at least one embodiment, the distributed system uses this information to determine whether to add or subtract capacity from the system, and to determine what type of capacity should be added. For example, in at least one embodiment, the system may determine to add additional 4-node clusters if these tend to be busier than the 8-node or 16-node clusters in a distributed system. Note that this skewing may result from routing queries based on analysis of the query, since certain types of queries will be directed primarily to certain types of systems. However, automatically adding over-used cluster configurations, and automatically removing under-used configurations, can help to optimize the overall allocation of resources in the distributed system.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following. In at least one embodiment, query-processing latency is reduced due to the effect of improved balancing of workload across the various nodes of the system.

In at least one embodiment, a system comprises a plurality of clusters of computing devices. The plurality of clusters of computing devices includes a first cluster and a second cluster. The first and second clusters each comprise a different number of computing devices. For example, the first cluster may be part of a group of 4-node clusters, and the second cluster may be part of a group of 8-node clusters.

The system further comprises at least one processor and at least one memory that stores executable instructions. When these instructions are executed, this causes the system to receive a request to process a query and to obtain an estimate of one or more computing resources that would be utilized by processing the query. These resources can include compute, memory, network, and storage resources. Alternatively, the resources can be measured using a single quantitative value, such as a query size estimate. In some embodiments, the estimate is generated based on a query plan that represents a plan for executing the query.

The system further determines to assign the query to the first cluster for processing, based on the estimate and on the number of computing devices in the first cluster compared to the number of computing devices in the second cluster. This helps to ensure that the cluster is of a size best suited to process the query.

The system then sends a request to process the query to the first cluster. There, a leader node determines that the cluster is able to process the query.

The system may also store information regarding the computing resources used to process queries. When the current query is received, the system can determine whether an identical or similar query has been previously processed, and use information from the processing of the earlier query to generate the estimate. In at least one embodiment, information about a query, such as its estimated and/or actual resource utilization, is stored so that it can be recalled from storage when an identical or similar query is subsequently received. In at least one embodiment, the information is indexed by a hash of the query.

In a further aspect, the system can respond to messages indicating that a cluster is unable to process an assigned query by attempting to reassign the query to another cluster. In addition, the system may also determine to add additional clusters, of a similar type, to the system in order to improve the available of clusters of the appropriate size.

Figure 8:
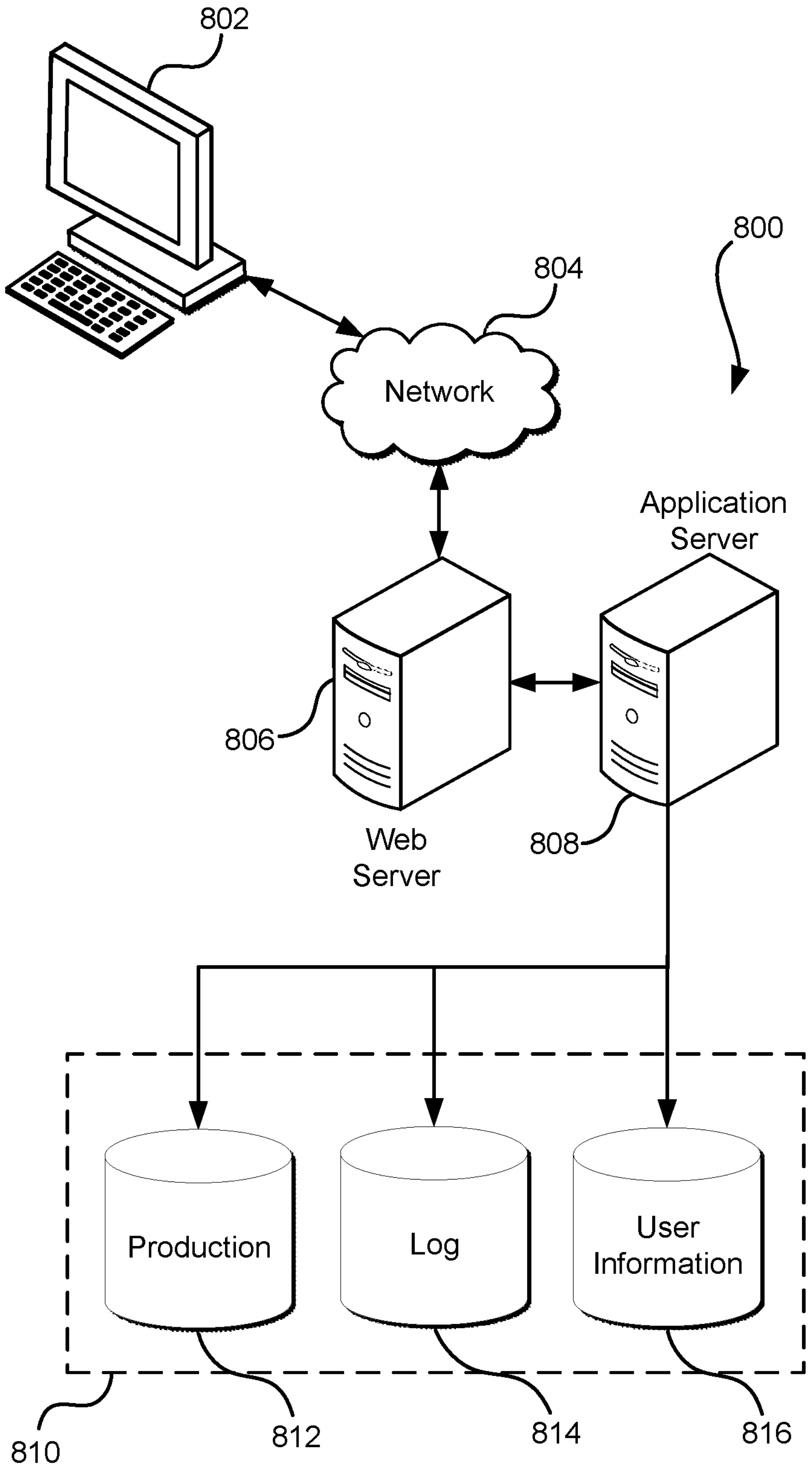
FIG. 8 illustrates a system in which various embodiments can be implemented.

FIG. 8 illustrates aspects of an example system 800 for implementing aspects in accordance with an embodiment. As will be appreciated, although a web-based system is used for purposes of explanation, different systems may be used, as appropriate, to implement various embodiments. In an embodiment, the system includes an electronic client device 802, which includes any appropriate device operable to send and/or receive requests, messages, or information over an appropriate network 804 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 806 for receiving requests and serving content in response thereto, although for other networks an alternative device serving a similar purpose could be used as would be apparent to one of ordinary skill in the art.

In an embodiment, the illustrative system includes at least one application server 808 and a data store 810, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 802 and the application server 808, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 810, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 812 and user information 816, which are used to serve content for the production side. The data store also is shown to include a mechanism for storing log data 814, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 810.

The data store 810, in an embodiment, is operable, through logic associated therewith, to receive instructions from the application server 808 and obtain, update or otherwise process data in response thereto, and the application server 808 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 802. Continuing with example, information for a particular item of interest is viewed in a dedicated page or window of the browser. It should be noted, however, that embodiments of the present disclosure are not necessarily limited to the context of web pages but are more generally applicable to processing requests in general, where the requests are not necessarily requests for content. Example requests include requests to manage and/or interact with computing resources hosted by the system 800 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 800, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, and software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A system, comprising:

a plurality of clusters of computing devices, the plurality of clusters of computing devices comprising a first cluster and a second cluster, wherein the first cluster comprises a different number of computing devices than the second cluster;

at least one processor; and at least one memory, the at least one memory comprising instructions that, in response to execution by the at least one processor, cause the system to at least:

receive a request to process a query;

obtain a first estimate of at least one computing resource that would be utilized by processing the query, based at least in part on first performance data received from the first cluster;

determine to tentatively assign the query to the first cluster for processing, based at least on the first estimate and a number of computing devices in the first cluster compared to a number of computing devices in the second cluster; and send the request to process the query to the first cluster, wherein a leader node of the first cluster:

determines, in response to the first cluster being tentatively assigned the query, whether at least one computing device of the first cluster is able to process the query based on a second estimate, generated by the leader node, based on second performance data obtained subsequently to the first performance data, of resources available to the first cluster; and causes the request to be either accepted and processed by the first cluster, or else rejected and not processed by the first cluster based, at least in part, on the determination of whether the at least one computing device of the first cluster is able to process the query, wherein the second cluster is caused to process the query based, at least in part, on the rejection.

2. The system of claim 1, wherein one of the plurality of clusters generates a query plan and generates the first estimate based, at least in part, on the query plan.

3. The system of claim 1, the at least one memory comprising further instructions that, in response to execution by the at least one processor, cause the system to at least:

store information indicative of computing resources used to process a second query, the second query determined to correspond to the query; and generate the first estimate based, at least in part, on the stored information.

4. The system of claim 1, the at least one memory comprising further instructions that, in response to execution by the at least one processor, cause the system to at least:

receive information indicative of one or more of the plurality of clusters, having the same number of computing devices as the first cluster, being unable to process the query; and in response to the information, cause an additional cluster to be added to the plurality of clusters, the additional cluster having a number of computing devices equivalent to a number of computing devices in the first cluster.

5. The system of claim 1, wherein the at least one computing resource comprises at least one of memory utilization, compute utilization, storage utilization, or network utilization.

6. A method, comprising:

receiving, at a distributed computing system, a request to process a query, the distributed computing system comprising a plurality of clusters of computing devices;

obtaining a first estimate of at least one computing resource that would be used by executing the query, based at least in part on first performance data received from the plurality of clusters of computing devices; and tentatively assigning the query to a first cluster of the plurality of clusters, based at least in part on the first estimate and a number of computing devices in the first cluster compared to a number of computing devices in at least one other cluster of the plurality of clusters, wherein the first cluster, in response to being tentatively assigned the query, determines whether at least one computing device in the first cluster is available to process the query, based on a second estimate generated by the first cluster based on second performance data obtained subsequently to the first performance data, of resources available to the first cluster; and causes the at least one computing device to reject processing of the query when the determination indicates that no computing device in the first cluster is available to process the query, wherein the rejection causes a second cluster of the plurality of clusters to process the query.

7. The method of claim 6, wherein the first estimate is based, at least in part, on a plan to execute the query generated by a leader node of one of the plurality of clusters.

8. The method of claim 6, further comprising:

storing information indicative of computing resources used to process the query in response to a prior request to process the query; and generating the first estimate based, at least in part, on the stored information.

9. The method of claim 6, wherein the query is tentatively assigned to the first cluster based, at least in part, on another cluster, of the plurality of clusters, declining an assignment to process the query.

10. The method of claim 6, further comprising:

determining that utilization of the first cluster is above a threshold amount; and in response to the determining, cause an additional cluster to be added to the plurality of clusters, the additional cluster comprising a number of computing devices equivalent to computing devices in the first cluster.

11. The method of claim 6, wherein the at least one computing resource comprises at least one of memory utilization, compute utilization, storage utilization, or network utilization.

12. The method of claim 6, wherein the first cluster processes the query in response to determining that the first cluster has a sufficient capacity of the at least one computing resource.

13. The method of claim 6, wherein the first cluster causes one or more computing devices of the first cluster to process the request.

14. A non-transitory computer-readable storage medium comprising instructions that, in response to execution by at least one processor of a computing device, cause the computing device to at least:

receive a request to process a query on a distributed computing system, the distributed computing system comprising a plurality of clusters of computing devices;

obtain a first estimate of at least one computing resource to be used by executing the query, based at least in part on first performance data received from the plurality of clusters of computing devices; and tentatively assign the query to a first cluster of the plurality of clusters, based at least in part on the first estimate and a number of computing devices in the first cluster compared to a number of computing devices in a second cluster of the plurality of clusters, wherein the first cluster, in response to being tentatively assigned the query, determines whether at least one computing device in the first cluster is able to process the query, based on a second estimate, generated by the first cluster based on second performance data obtained subsequently to the first performance data, of resources associated with the first cluster, and rejects the request to process the query in response to the determination indicating that no computing device in the first cluster is able to process the query, wherein the second cluster is made to process the query based at least in part on the rejection.

15. The non-transitory computer-readable storage medium of claim 14, comprising further instructions that, in response to execution by the at least one processor, cause the computing device to at least:

receive the first estimate from a leader node of one of the plurality of clusters.

16. The non-transitory computer-readable storage medium of claim 14, comprising further instructions that, in response to execution by the at least one processor, cause the computing device to at least:

receive information indicative of an amount of the resource used to process the query;

store the information with an identifier of the query; and generate a subsequent estimate based, at least in part, on the stored information.

17. The non-transitory computer-readable storage medium of claim 14, comprising further instructions that, in response to execution by the at least one processor, cause the computing device to at least:

tentatively assign the query to the first cluster based, at least in part, on an indication that one or more other clusters, of the plurality of clusters, is unable to process the query.

18. The non-transitory computer-readable storage medium of claim 14, comprising further instructions that, in response to execution by the at least one processor, cause the computing device to at least:

add an additional cluster to the plurality of clusters based, at least in part, on a frequency of clusters declining an assignment to process the query.

19. The non-transitory computer-readable storage medium of claim 14, wherein the first cluster processes the query in response to determining that the first cluster has a sufficient capacity of the at least one computing resource.

20. The non-transitory computer-readable storage medium of claim 14, comprising further instructions that, in response to execution by the at least one processor, cause the computing device to at least:

tentatively assign the query to the first cluster based, at least in part, on a determination that the first cluster has previously processed another query determined to be similar to the query.

* * * * *